No. 788,617. Patented May 2, 1905.

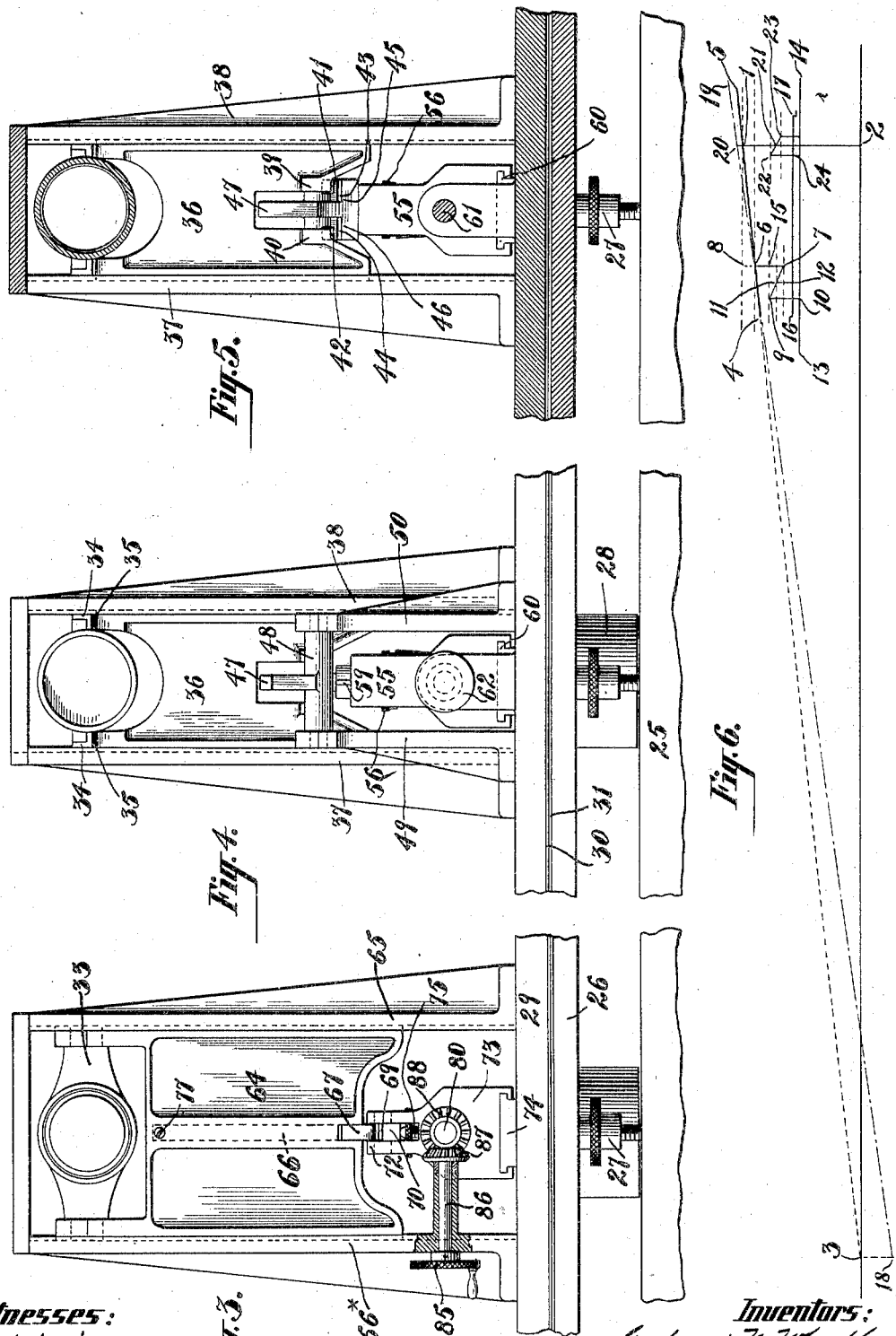

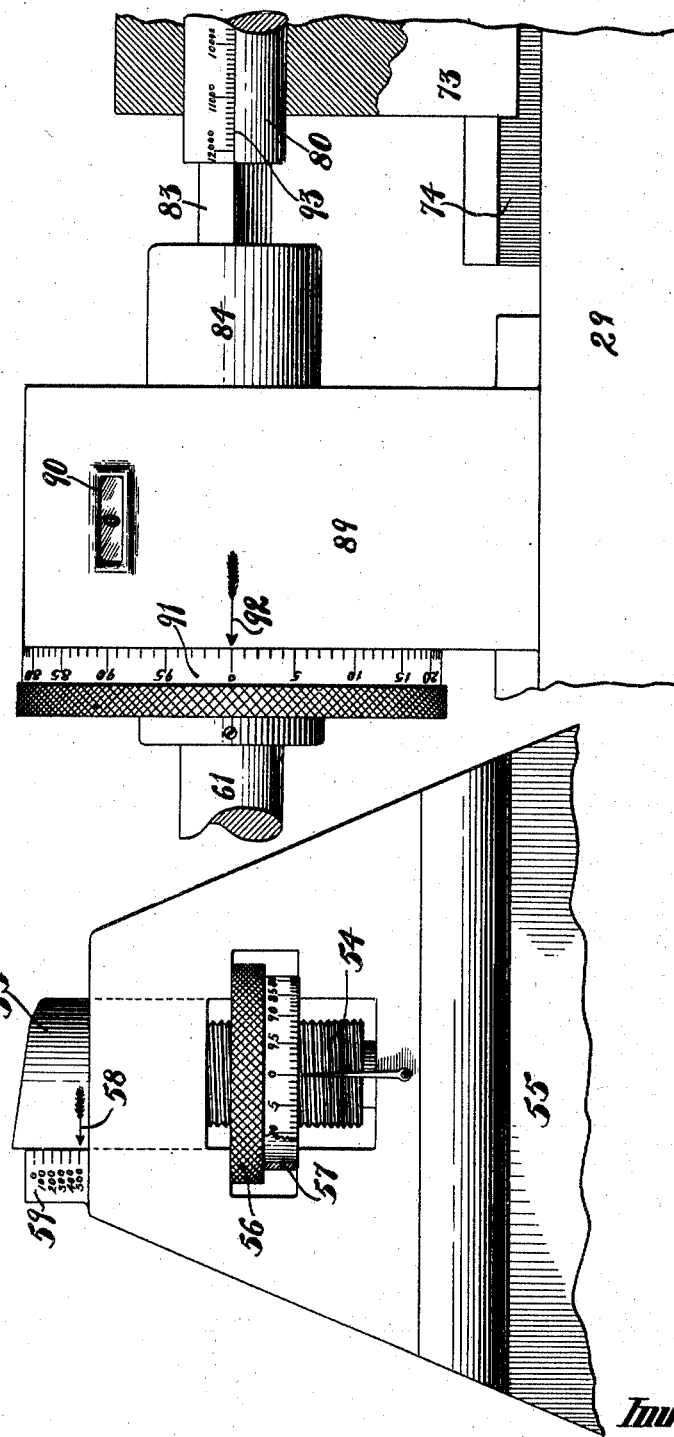

UNITED STATES PATENT OFFICE.

GARLAND N. WHISTLER AND CLINT C. HEARN, OF FORTRESS MONROE, VIRGINIA, ASSIGNORS OF ONE-HALF TO ELLEN WHARTON WHISTLER AND ONE-HALF TO LAURA OVERAKER HEARN.

DEPRESSION POSITION-FINDER.

SPECIFICATION forming part of Letters Patent No. 788,617, dated May 2, 1905.

Application filed May 25, 1904. Serial No. 209,776.

*To all whom it may concern:*

Be it known that we, GARLAND N. WHISTLER and CLINT C. HEARN, citizens of the United States, and residents of Fortress Monroe, in the county of Elizabeth City and State of Virginia, have invented a new and useful Depression Position-Finder, of which the following is a specification.

Our invention relates to a depression position-finder, and more particularly to an instrument of this character which shall be capable of automatically correcting for curvature and refraction when set for the particular length within the limit of ranges for which the instrument is intended.

The particular instrument which we have chosen to embody our invention is designed for artillery purposes and is supposed to be situated upon a height from which the length to the objective point—for instance, the water-line of a vessel floating on the water—is determined from the angular depression of the telescope.

Our invention consists of mechanical means under the control of the means for tilting the telescope, whereby the range-indicating device will indicate the range corresponding to the angular depression of the telescope within the limits of the maximum predetermined range.

A practical embodiment of our invention is represented in the accompanying drawings, in which—

Figure 1:
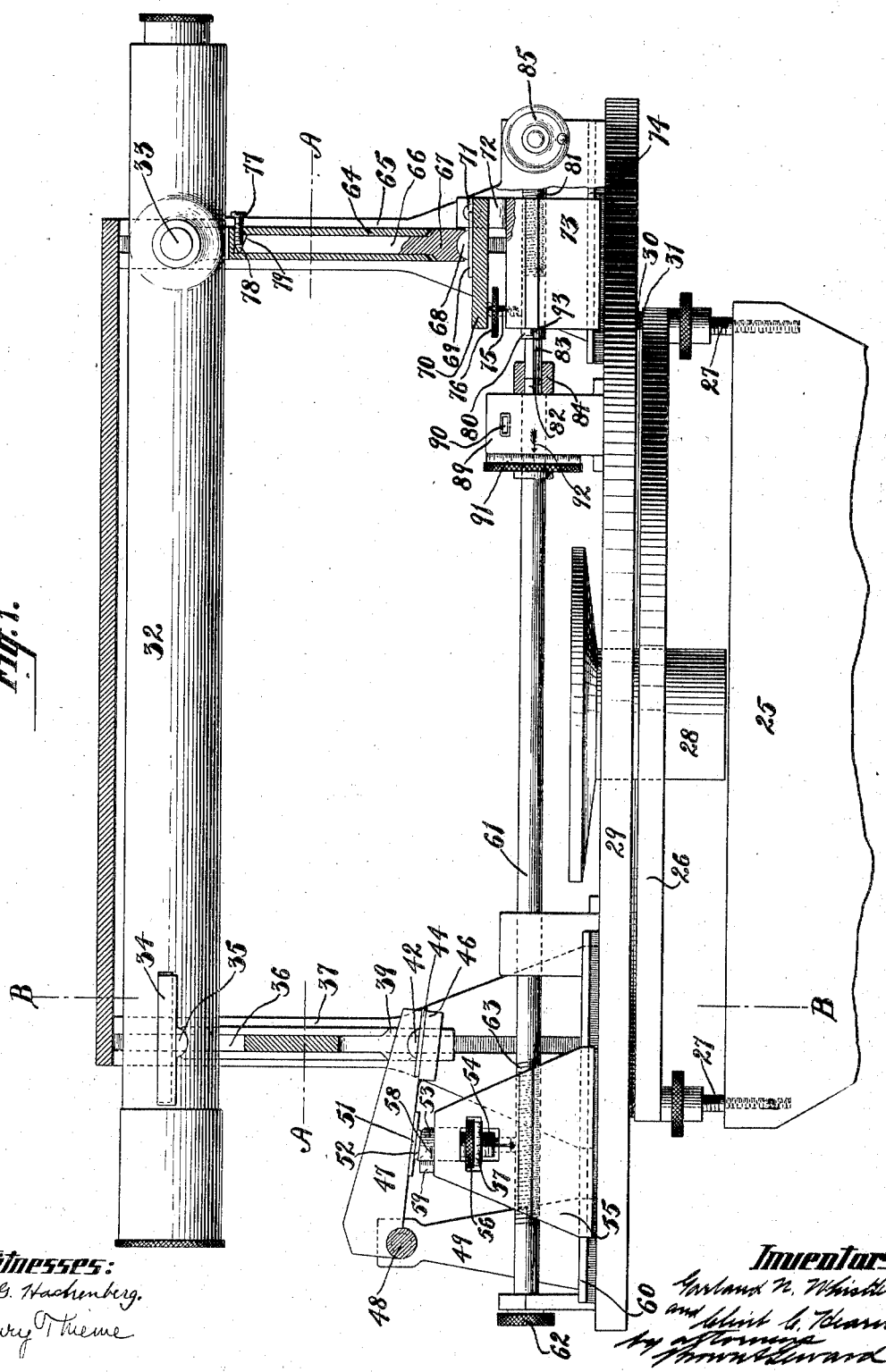
Figure 2:
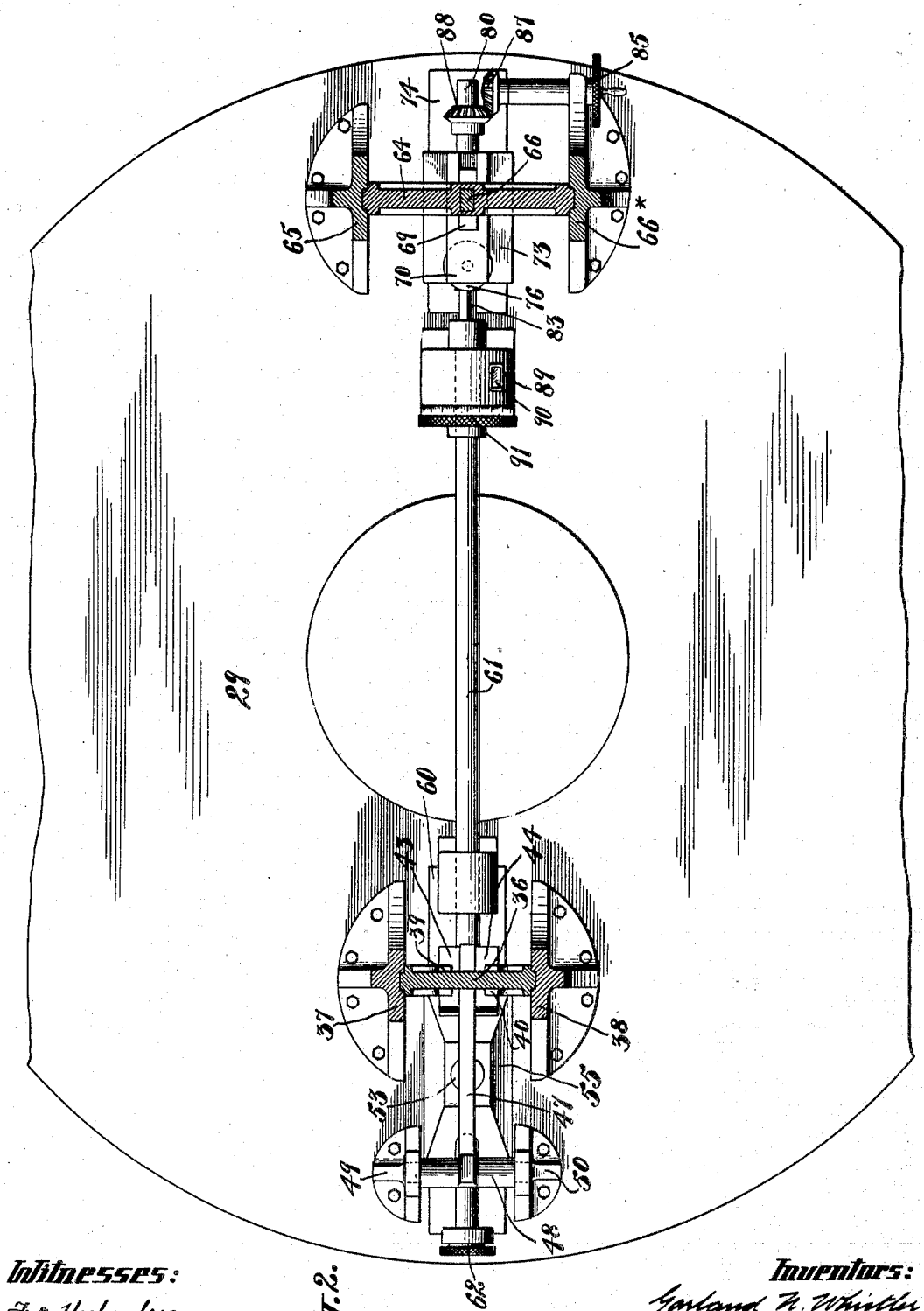

Figure 1 is a view of the instrument in central longitudinal section. Fig. 2 is a view in horizontal section in the plane of the line A A of Fig. 1. Fig. 3 is a rear end elevation, partly in section. Fig. 4 is a front end elevation. Fig. 5 is a vertical transverse section taken in the plane of the line B B of Fig. 1 looking toward the front. Fig. 6 is a diagram for illustrating the practical application of the instrument. Fig. 7 is an enlarged view in detail of the height-scale and the parts immediately adjacent thereto; and Fig. 8 is an enlarged view in detail, showing the scale-wheel for determining fractional parts of a hundred yards of range.

We employ two mechanical devices for tilting the telescope. These two devices are arranged to be actuated simultaneously from a shaft in such manner that each turn of the shaft will depress the telescope through an angle corresponding to one hundred yards of range. A simple tally device to indicate the number of turns of the shaft will indicate the number of one hundred yards of range, and a wheel permanently attached to the shaft and having its periphery divided into one hundred parts will indicate single yards of range. These two mechanical devices are placed one at or near each end of the telescope. The one at the object-glass end is called the "length-measuring device" and the one at the eyepiece end is called the "correction device." In order to understand the action of these two mechanical devices reference will be had to the diagram Fig. 6. Referring to said Fig. 6, we will assume that the instrument is situated at a height indicated by the line 1 2 and that the point 3, the range of which is required, is situated upon a horizontal plane 3 2, passing through the foot of the vertical line 1 2. Let the dark full line 5 indicate the telescope trunnioned at 1. The full lines shown under the front end of the telescope will represent the range-measuring device consisting of the front support 6 7, which has a vertical motion so controlled that the horizontal distance 1 8 is constant and equal to twenty-four inches. The line 1 8 is a horizontal line passing through the trunnion 1. On the upper end of the support 6 7 the front of the telescope rests, and the lower end of the support 6 7 rests upon the end of a lever 7 9, fulcrumed at 9 on a fixed support 9 10, while the lever 7 9 rests upon a height-screw 11 12. 13 14 represent the base of the instrument, which is carefully leveled. The horizontal distance from the hinge 9 of the lever 7 9 to the support 7 6 of the telescope is constant and is for our purposes made six inches. The particular length of the height-screw 11 12 depends upon the height 1 2, and as the instrument must be universal—*i. e.*, suited to any height—the height-screw is made adjustable. The length of the support 6 7 is equal to the distance from 8 to the point 15 on the horizontal plane of the fulcrum 9—i. e., to the distance between the horizontal planes passing through the trunnion 1 and through the fulcrum 9. Let 16 17 represent a screw for moving the height-screw 11 12 bodily along the base-line 14 13 parallel to itself. This will cause the lever 7 9 to rise and fall, and hence through the support 6 7 will cause the telescope to tilt. If now the range 2 3 is to be determined, we move the height-screw until the telescope is pointed at 3, as shown in the diagram. In constructing this instrument we make its maximum reading twelve thousand yards, the scale of the instrument being two thousand yards to the inch. Up to this point we have assumed that the point 3 is on the horizontal plane 2 3. In actual practice the point 3 would be upon the surface of the water and generally below the plane 2 3. The image of the point, which is what the telescope is actually aimed at, might be thrown up or down by atmospheric refraction. In order to correct for this, we must tip the telescope until it is aimed at the image without changing the reading of the range-measuring device—i. e., we must turn the telescope about the point 6. The simplest mechanical way to do this is to raise or lower the trunnions at 1. The correction device is placed under the trunnions at 1, and to this end we place the correction device under the trunnions 1. Thus, for example, as shown in the diagram Fig. 6 the point at which we wish to aim is located at 18 instead of 3. We tip the telescope until its axis is on the line 18 19. The horizontal range to 18 is the same as the horizontal range to 3, and as we have not altered the reading of the range-indicator the instrument reads the correct range to 18. The problem, therefore, is to raise the trunnions of the telescope the correct amount to allow for these conditions. To practically solve the problem, the trunnions must be raised the distance from the point 1 to the point 20 on the line 18 19. We find by mathematical computation that the distances 1 20, which the telescope is tilted, are directly proportional to the ranges to which they apply, and we further find that the limit of this correcting-tilt for a range of twelve thousand yards will not exceed one-eighth of an inch in an instrument constructed as indicated and with a maximum range of twelve thousand yards. The trunnions at 1 are on a support indicated by the line 1 21, which rests on a lever 22 23, fulcrumed at 23 with its free end on an adjusting-screw, (indicated by the line 22 24,) while the lever 22 23, together with this fulcrum-support 23 and the adjusting-screw 24, are capable of being bodily moved along under the trunnion-support 1 21 by means of the screw 16 17 to raise and lower the trunnions. As this trunnion raising and lowering device is moved by the same screw which moves the range-measuring device, the distance moved is always proportional to the range, and just what this ratio shall be may be determined by the number of threads to the inch on the screw 16 17, which serve to move these devices, respectively.

Referring now to the structure of the instrument, the pedestal is denoted by 25. Upon this pedestal the azimuth-circle 26 is supported by means of leveling-screws 27.

28 is a vertical centering-shaft, which should not touch the pedestal 25, and 29 is a plate capable of being turned about the centering-shaft 28 and supported above the azimuth-circle 26 by the bearing-rings 30 31. The structure of the azimuth-circle may be of well-known and approved form and forms no part of our present invention, and hence will not be further described.

The telescope is denoted by 32. It is here represented as a three-inch telescope supported at the eyepiece end on trunnions 33 and at the opposite or front end by straight guides 34 on rocking shoes 35. It is to be understood that there is a guide, like 34, on the opposite side of the telescope and a shoe, like 35, seated in the guide on the opposite side of the telescope. The shoes 35 rest with their curved or semicircular bearings in the concave upper ends of a bifurcated slide 36, which is itself carried between guides 37 38, fixed to the plate 29, uprising therefrom on opposite sides of the telescope. On the lower end of the slide 36 are trunnion-beds 39 40, which rest on semicylindrical or half trunnions 41 42 on shoes 43 44, having a sliding engagement with the top surfaces of laterally-projecting cheeks 45 46 on the rear end of the lever 47. The lower face of the lever 47 is in the same plane with the upper faces of the cheeks 45 46, and the said lever 47 is fulcrumed at 48 in standards 49 50, fixed to and uprising from the plate 29, while the lever rests upon a sliding shoe 51, provided with a semicylindrical or half trunnion 52, which rests in a trunnion-bed 53 in the top of a screw 54, supported in a sliding block 55 by means of a nut 56, engaged with the screw and swiveled in the block. The nut 56 has frictionally engaged therewith so that it may be shifted in a rotary direction relative thereto a scale 57, divided in the present instance into a hundred equal parts and forming a micrometer-scale, and the screw-threads on the screw 54, with which the nut 56 engages, are made fifteen to the inch. The trunnion-bed 53, which in the present instance is an upward extension of the screw 54, is provided with a mark 58, which, as the screw 54 is moved vertically, is carried along in proximity to a scale 59, fixed to the block 55. This scale 59 is divided into units each representing a hundred feet. It is obvious, therefore, that the turn of the micrometer-scale with the nut a single unit on the scale will elevate the screw one fifteen-hundredth of an inch. The block 55 rests on the straight horizontal guide 60, secured to the plate 29, and may be moved along this guide, keeping the screw 54 vertical while the shoe 51 slides along the under side of the lever 47 and in the event the said lever is depressed raises it or lowers it according to the direction in which the block 55 moves, and thereby raises or depresses the forward end of the telescope through the support 36, resting on the free end of the lever. The horizontal distance between the axis of the fulcrum 48 and the axis of the trunnion 42 on the shoe 44 is six inches. The block 55 is made to travel along its way or track 60 by means of a horizontal shaft 61, mounted in suitable bearings fixed to and uprising from the plate 29 and having a screw-threaded engagement with the block 55, the said shaft 61 being provided with a milled disk 62 for turning it. The screw-threads 63 on the shaft 61, which engage the block 55, are made twenty to the inch and are accurately fitted to corresponding threads in the block.

The rear or eyepiece end of the telescope has its trunnions 33 supported in a vertically-movable slide 64, arranged to move vertically in suitable standards 65 66*, (see Fig. 3,) fixed to and uprising from the plate 29 on opposite sides of the telescope. The vertically-movable sliding support 64 is fitted to slide therein, a bar 66, provided on its lower end with a trunnion-bed 67, which rests on a half-trunnion or semicylindrical bearing 68, carried by a shoe 69, resting on and having a sliding engagement along the upper surface of a lever 70, fulcrumed at 71 in an upward extension 72 of a block 73, resting on and fitted to slide along a track 74 on the plate 29. The free end of the lever 70 is raised and lowered within limits which are amply sufficient for the purposes in hand by means of a screw 75, tapped in the top of the block 73 and operated by a milled disk 76. This screw 75 we term the "refraction-screw."

The vertical bar 66, which slides in the support 64, is adjusted with respect to the support 64 to lengthen or shorten the support as a whole by means of a screw 77, having a screw-threaded engagement in the rear wall of the support 64 and extending through the same, where it is provided with a conical end 78, which rests on a slanting upper end 79 of a bar 66. It is obvious that as the screw 77 is forced inwardly its conical end will force the support 64 upwardly away from the end of the bar 66 and that when the screw 77 is turned in the reverse direction it will permit the support 64 to move downwardly toward the end of the bar 66, and thus shorten the support as a whole.

The block 73 is moved horizontally along its track 74, carrying with it the lever 70 by means of a shaft 80, having a screw-threaded engagement with the block, the screw-threads 81 on the shaft 80 being made sixty to the inch and accurately fitted to the corresponding threads in the block 73. The shaft 80 forms a practical continuation of the shaft 61, but is made separable therefrom, so that each part 61 and 80 may be when desired manipulated independently of the other.

For purposes of uniting them and disconnecting them we provide the shaft 61 with a squared portion 82 and the shaft 80 with a squared portion 83 and mount a sliding sleeve 84 on the squared portions of the shafts, so that when it is in position shown in Fig. 1, overlapping the adjacent ends of the two shafts, it will lock them together as one; but when it is slid to the right onto the squared portion 83 of the shaft 80, so as not to overlap the squared portion 82 of the shaft 61, each of the said shafts may be moved independently of the other. The shaft 80 is moved independently, and the two shafts when locked are moved combinedly by means of a hand-wheel 85 on the end of a transverse shaft 86, (see Fig. 3,) carrying on its end a bevel-gear 87, which intermeshes with a bevel-gear 88 on the rear end of the shaft 80.

89 represents conventionally a tallying device of any well-known or approved form by means of which the number of rotations of the shaft 61 may be read through a peep-hole 90 in the casing. The shaft 61 is also provided with a scale-wheel 91, fixed thereon, the periphery of which is conveniently divided into one hundred equal parts to indicate partial revolutions of the shaft, and a guide-mark 92 is placed on the face of the casing 89 for convenience in reading the number of units which the scale-wheel has been turned.

The exact distance between the vertical transverse plane which passes through the axis of the trunnion 33 of the telescope and the transverse plane which passes through the central axis of the vertically-sliding support 36 at the object end of the telescope is twenty-four inches.

The mechanical structure of the device, as above explained, is such that a single revolution of the shaft 61 will depress the telescope through an angle corresponding to one hundred yards of range, and hence the rotation of said shaft a distance of one unit on the scale-wheel 91 will correspond to one yard of range. The rotary motion of the combined shafts 61 80 through the differential travel of the blocks 55 and 73 will tilt the telescope, giving it the proper or corrected inclination for curvature and refraction for any range up to the maximum—twelve thousand yards—to which the combined shafts may be set without further manipulation of the machine than to operate the combined shafts 61 and 80 until the telescope points to the apparent position of the object, assuming, of course, that the instrument has been first properly adjusted in the position where it is used.

As a preliminary adjustment in setting up the instrument it should be first set to read twelve thousand yards by turning the shafts 61 80. Then set the height-scale by operating the screw 54 until the mark 58 points at "0" on the scale 59. Then level the telescope by manipulating the refraction-screw 75. Now slide the collar or sleeve 84 onto the shaft 80, leaving the two shafts free to be manipulated independently of each other. Turn the shaft 61 by means of the milled disk 62, moving the block 55 toward the front. The telescope should remain level during this operation. If it does not, half the error should be adjusted by means of manipulating the screw 54 and the other half by manipulating the refraction-screw 75. When the error is corrected, so that the travel of the block 55 does not effect the telescope, move the scale 57 on the nut 56 without moving the nut 56 until "0" on the scale corresponds to the guide-mark on the block 55—*i. e.*, set the scale to "0." The front end of the telescope is now in adjustment. Next turn the shaft 80 by means of the wheel 85, causing the block 73 to travel back and forth along its track. If the telescope does not remain level while the block 73 so moves, correct half the error by the screw 77 and the other half by the refraction-screw 75. Repeat these trials and when for all positions of the block 73 the telescope remains level the error is corrected and the front support has the proper length. Now set the tally in the device 89 to read twelve thousand yards and the block 73 to read twelve thousand yards by the scale 93 on the shaft 80. Re-couple the shafts 61 and 80. The last adjustment completes the preliminary adjustment, and the final adjustment for use is made as follows: Manipulate the height-scale by operating the screw 54 until it reads the height of the instrument above the actual water-line level, which must be computed by adding to or subtracting from the height of the instrument above mean high water or mean low water, as the case may be, the actual height of the tide below the high-water-line mark or above the mean low-water mark. Then by manipulating the connected shafts 61 and 80 make the instrument read the range to any fixed object whose water-line can be seen and whose range is known and by means of the refraction-screw bring the horizontal wire in the telescope to coincide with this water-line. The instrument is now adjusted for all ranges within its limit while that condition of the atmosphere prevails.

What we claim is—

1. In a depression position-finder, mechanical means for automatically correcting the tilt of the telescope to account for curvature and refraction, at different ranges.

2. In a depression position-finder, mechanical means for directing the telescope successively toward different objects or apparent objects at different ranges, and mechanical means under the control of the telescope-directing means for automatically correcting the tilt of the telescope for curvature and refraction, for different ranges of the objects.

3. In a depression position-finder, means for automatically correcting the position of the telescope for curvature and refraction during the operation of sighting the object.

4. In a depression position-finder, means for simultaneously moving the supports for the opposite ends of the telescope vertically at different rates of speed.

5. In a depression position-finder, means for simultaneously and independently moving the supports for the opposite ends of the telescope vertically at different rates of speed.

6. In a depression position-finder, vertically-movable supports for the opposite ends of the telescope, the said supports being spaced apart a predetermined distance having a known relation to the maximum range of the instrument, a lever fulcrumed at a distance from the support at the object-glass end of the telescope having a predetermined relation to the distance between the two supports and forming a support for the telescope-support at the object end of the telescope, a sliding block under the control of the observer for raising and lowering the lever and hence the object-glass end of the telescope and means under the control of the observer for raising and lowering the eyeglass end of the telescope.

7. In a depression position-finder, supports for the opposite ends of the telescope, a vertically-swinging lever on which the support for the telescope at the object-glass end rests, a screw for lifting the lever, a horizontally-sliding block in which the screw is mounted, a scale carried by the block to indicate the position of the screw and hence the number and means under the control of the observer for sliding the block in a horizontal direction to raise and lower the lever and hence the object-glass end of the telescope.

8. In a depression position-finder, vertically-movable supports for the opposite ends of the telescope, levers on which the said vertically-movable supports rest, horizontally-movable blocks for operating the levers and means for simultaneously moving the blocks at different rates of speed along their tracks.

9. In a depression position-finder, vertically-movable supports for the opposite ends of the telescope, levers on which the said supports rest, horizontally-movable blocks, one of the said blocks having one of the levers fulcrumed thereon and the other of said blocks being arranged to travel horizontally beneath the other of said levers and means for simultaneously moving the said blocks horizontally at different rates of speed.

10. In a depression position-finder, vertically-movable supports for the opposite ends of a telescope, fixed guides for the said vertically-movable supports, horizontally-movable blocks, a lever fulcrumed on one of the blocks and forming a support for the vertically-movable telescope-supports at the eyeglass end of the telescope, a lever fulcrumed on a fixed support and forming a support for the vertically-movable telescope-support at the object end of the telescope, a vertically-movable screw seated in the other of said blocks and engaged with the under side of the last-named lever and a shaft having a screw-threaded engagement with the two blocks and under the control of the observer to simultaneously move them.

11. A depression position-finder, vertically-movable supports for the opposite ends of the telescope, vertically-movable levers on which the said supports rest, horizontally-traveling blocks, vertically-movable screws seated, one in each block and forming supports for the free ends of said levers and means under the control of the observer for simultaneously moving the blocks.

12. In a depression position-finder, vertically-movable supports for the opposite ends of the telescope, horizontally-movable blocks for moving said supports and a two-part shaft engaged with the blocks and under the control of the operator to operate the blocks simultaneously and independently at pleasure.

13. In a depression position-finder, vertically-movable supports for the opposite ends of the telescope, horizontally-movable blocks for operating the said supports, a two-part shaft engaged with the blocks and under the control of the observer to operate the blocks, and a sliding collar or sleeve mounted on adjacent squared portions on the two parts of the shafts for locking them to move together and unlocking them to move independently of one end.

14. In a depression position-finder, a vertically-movable trunnion-support at the eyeglass end of the telescope, means for increasing and decreasing the length of said support at pleasure, means for raising and lowering the support as a whole and means for raising and lowering the object-glass end of the telescope.

15. In combination, the primary support, a lever fulcrumed on said support, a secondary support resting on the lever, means for elevating and depressing the lever and a horizontally-movable support for said lever-adjusting means.

16. In combination, the primary support, a lever fulcrumed on the primary support, an extensible and contractible vertical support resting on the lever, means for elevating and depressing the lever and a horizontally-movable support for said lever-adjusting means.

In testimony that we claim the foregoing as our invention we have signed our names, in presence of two witnesses, this 21st day of May, 1904.

GARLAND N. WHISTLER.
CLINT C. HEARN.

Witnesses:
  H. G. PARKER,
  C. S. SUNDGREN.